United States Patent [19]

Patton, Jr. et al.

[11] 4,359,541
[45] Nov. 16, 1982

[54] PROCESS FOR THE PREPARATION OF POLYISOCYANURATE DISPERSIONS AND COMPOSITIONS PREPARED THEREFROM

[75] Inventors: John T. Patton, Jr., Wyandotte; Thirumurti Narayan; Gerhard G. Ramlow, both of Grosse Ile, all of Mich.

[73] Assignee: BASF Wyandotte Corporation, Wyandotte, Mich.

[21] Appl. No.: 225,935

[22] Filed: Jan. 19, 1981

[51] Int. Cl.$^3$ .................... C08G 18/14; C08G 18/75; C08G 18/77
[52] U.S. Cl. .................... 521/137; 252/182; 521/160; 521/161; 521/902; 528/49; 528/73; 544/193; 544/221; 524/377; 524/386; 524/590
[58] Field of Search .............. 521/902, 160, 161, 117, 521/137; 544/193, 221; 252/182; 528/49, 73; 260/33.2 R

[56] References Cited

U.S. PATENT DOCUMENTS

| | | | |
|---|---|---|---|
| 3,280,066 | 10/1966 | France et al. | 521/902 |
| 3,645,979 | 2/1972 | Liebsch et al. | 521/161 |
| 3,652,424 | 3/1972 | Jackson et al. | 528/45 |
| 3,996,223 | 12/1976 | Gupta et al. | 521/159 |
| 4,125,491 | 11/1978 | Gorman et al. | 521/902 |
| 4,255,569 | 3/1981 | Mueller et al. | 544/193 |

*Primary Examiner*—H. S. Cockeram
*Attorney, Agent, or Firm*—Norbert M. Lisicki

[57] ABSTRACT

Polyisocyanurate polymers are prepared by polymerization of polyisocyanates in organic solvents employing trimerization catalysts. The polyisocyanates are reacted with monofunctional active hydrogen compounds prior to polymerization or subsequent to the polymerization. These polymers may be dispersed in polyols for the preparation of cellular and non-cellular polyurethane products having improved physical properties.

32 Claims, No Drawings

PROCESS FOR THE PREPARATION OF POLYISOCYANURATE DISPERSIONS AND COMPOSITIONS PREPARED THEREFROM

BACKGROUND OF THE INVENTION

1. Field of the Invention

The present invention relates to polyisocyanurate polymer, to an improved process for the preparation of polyisocyanurate dispersions, and to cellular and non-cellular compositions prepared from said polyisocyanurate dispersions. More particularly, the invention relates to polyisocyanurate polymers, an improved process for the preparation of polyisocyanurate dispersions of said polymers in polyols, and to cellular and non-cellular polyurethane compositions prepared employing said dispersions.

2. Description of the Prior Art

The prior art generally teaches the preparation of isocyanurate-modified isocyanate products employing a variety of catalysts. Among these are U.S. Pat. No. 3,996,223 which teaches a process for preparing polyisocyanates containing isocyanurate structures by polymerization in the presence of a mixture of Mannich bases and carbamic acid esters. U.S. Pat. No. 3,645,979 teaches the use of an organic phosphine catalyst to prepare isocyanurate structures. U.S. Pat. No. 3,652,424 teaches a process for the preparation of polyisocyanate compositions containing 5 to 19 percent by weight toluene diisocyanate trimer employing substituted guanidines and isobiguanides as catalysts. U.S. Pat. No. 4,125,491 teaches the preparation of a composition of matter which consists of the reaction product of trimerized toluene diisocyanate with about 0.02 to 0.25 equivalent, based on free isocyanate groups, of an active hydrogen compound which may either be a secondary aliphatic monoamine containing 24 to 36 carbon atoms or a mixture of such amine with an aliphatic alcohol containing 12 to 24 carbon atoms and dispersed in a mixture of toluene and heptane. Not more than 25 percent of the free NCO groups are allowed to react with the active hydrogen compounds. This patent further teaches the use of the dispersions as adhesives or surface coating compositions. Neither the dispersion in polyether polyol or polyester polyol nor polyurethane compositions using the dispersion of the instant invention are taught in this patent. None of the prior art teaches the preparation of polyisocyanurate polymer which is readily dispersed in a polyol and subsequently employed for the preparation of cellular and non-cellular polyurethane products.

SUMMARY OF THE INVENTION

The present invention relates to an improved process for the preparation of dispersible polyisocyanurate polymer, dispersions of the polyisocyanurate polymer in polyols and the polyurethane products prepared from these polyisocyanurate polyol dispersions.

DESCRIPTION OF THE PREFERRED EMBODIMENT

In accordance with the invention, polyisocyanurate polymers are prepared by polymerization of polyisocyanates using appropriate trimerization catalysts. These polyisocyanurate polymers are then dispersed in polyols. The dispersions of the polyisocyanurate polymers in polyols are then employed for the preparation of cellular and non-cellular polyurethane products. The polyisocyanurate polymers and dispersions thereof are prepared by several improved procedures compared to co-pending application Ser. No. 225,934 filed Jan. 19, 1981.

A. A dispersible polyisocyanurate polymer is prepared by (a) polymerizing an organic polyisocyanate in an organic solvent in the presence of an effective amount of a trimerization catalyst, (b) deactivating the catalyst, and (c) reacting the free isocyanate groups in the polyisocyanurate polymer with a monofunctional active hydrogen compound. The extent of polymerization is monitored by measuring the free NCO content of the mixture. After the free NCO content of the mixture has decreased by about 75 percent from the original content, the residual free NCO groups are reacted with the monofunctional active hydrogen compounds.

B. In another embodiment, a dispersible polyisocyanurate polymer is prepared by (a) partially reacting an organic polyisocyanate with a monofunctional active hydrogen compound, (b) polymerizing said pre-reacted polyisocyanate in an organic solvent and in the presence of an effective amount of a trimerization catalyst, (c) deactivating said catalyst, and (d) reacting the residual free isocyanate with a monofunctional active hydrogen compound.

C. In still another embodiment, a dispersible polyisocyanurate polymer is prepared by (a) partially reacting an organic polyisocyanate with a monofunctional amine, (b) polymerizing said pre-reacted polyisocyanate in an organic solvent and in the presence of an effective amount of a trimerization catalyst, (c) deactivating the catalyst, and (d) reacting the residual free isocyanate with a monofunctional active hydrogen compound.

D. A further embodiment is a dispersion of polyisocyanurate polymer in a polyol prepared by (a) polymerizing an organic polyisocyanate in an organic solvent in the presence of an effective amount of a trimerization catalyst to a free NCO content of about 75 percent of the original content, (b) deactivating said trimerization catalyst, and (c) reacting the residual free isocyanate with a monofunctional active hydrogen compound. The products of procedures A–D are then mixed with a polyol and the organic solvent is removed by any appropriate means.

More specifically, the polyisocyanurate polymer may be prepared by the polymerization of a 5 to 50 percent solution of an organic polyisocyanate in ethyl acetate or any other suitable solvent in the presence of catalytic quantities of a trimerization catalyst. The temperature of the mixture is maintained at about 50° C. for up to four hours at which time the free NCO value of the reaction mixture is reduced to the desired value. Benzoyl chloride, equal in weight to that of the trimerization catalyst, is then added to deactivate said catalyst. After maintaining the reaction temperature at 50° C. for about 15 minutes, a monofunctional active hydrogen compound is reacted with the residual NCO groups. This mixture is allowed to react at 50° C. for 2 hours. If desired, a catalyst such as dibutyltin dilaurate may be employed to increase this reaction rate. The reaction contents are then transferred into the desired polyol while the polyol is stirred at high speeds. The solvent is then removed by stripping at pressures of 2 millimeters Hg and maximum temperatures of 70° to 80° C.

In the event procedure C is employed, the organic polyisocyanate and the monofunctional amine are reacted at 150° C. The contents are then cooled to 50° C. Further, reaction conditions are then conducted similar to those listed above. Any of the polymers produced by procedures A, B, or C may be dispersed in a polyol using the procedure as disclosed above. Either during the mixing or solvent stripping operation, the temperature of the dispersion is preferably not allowed to increase above 100° C. The concentration of polyisocyanurate polymer dispersed in the polyol may range from 1 to 80 percent by weight, preferably from 5 to 50 percent by weight.

The products of the invention may be represented by the following equation when the isocyanate used is difunctional. Comparable structures will be formed when tri-, tetra- and polyisocyanates are employed:

$$Z[OCN-R'-NCO] \xrightarrow[\text{SOLVENT}]{\text{CATALYST}}$$

polyisocyanate

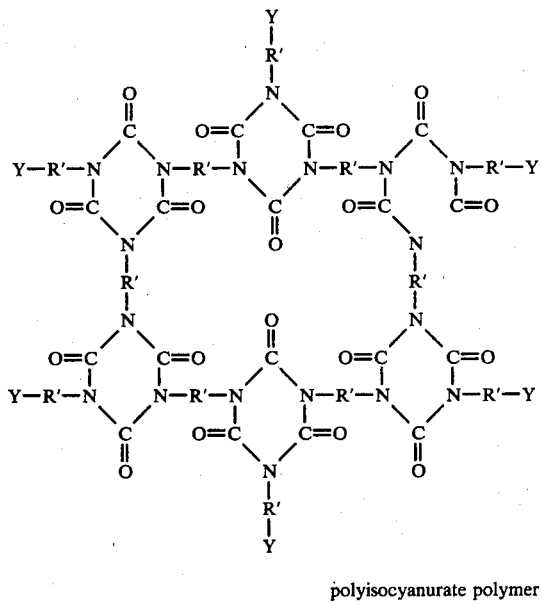

polyisocyanurate polymer wherein Z is at least 3 and Y is

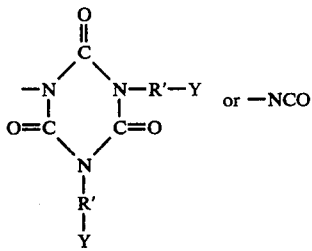 or —NCO and wherein R' is as described hereinafter. Assuming that R' is:

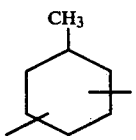

the resulting free NCO content decreases from 48.3 percent to about 8.0 for one of the polymers of this invention, and has an equivalent weight based on end group analysis of 522. The trimer of toluene diisocyanate has a free NCO content of 24.2 percent and an equivalent weight of 174. The equivalent weights of the polyisocyanurate polymers of the invention are greater than 174 and have a free NCO content of less than 24.2 percent. The preferred equivalent weights range from 210 to 4200 with free NCO contents ranging from about 1 to 20 percent based on the polymer weight.

The free NCO contents are determined by methods well known to those skilled in the art. These include the titration of a solution of the polyisocyanate compound with a solution of dibutylamine followed by back titration of the excess unreacted amine with an alcoholic HCl solution. The polyisocyanurate polymers are essentially free of the starting polyisocyanate monomer.

The dispersions of the subject polymers may be prepared by adding the solution of the finely divided polyisocyanurate polymer into the polyol which is being stirred at a very rapid rate. During the mixing operation, the temperature of the dispersion is not allowed to increase above 100° C. The concentration of polyisocyanurate polymer dispersed in the polyol may range from 1 to 80 percent by weight, preferably from 5 to 50 percent by weight.

Among the monofunctional active hydrogen compounds which may be employed in the invention are those saturated alcohols which have the following formula:

$$C_n-H_{2n+1}-OH$$

wherein n is 1 to 20. Those contemplated include alcohols such as methyl, ethyl, normal propyl and isopropyl, primary, secondary and tertiary butyl, primary, secondary and tertiary amyl, hexyl, heptyl, octyl, nonyl, decyl, undecyl, eicosyl, methylpentyl, 2-ethylbutyl, 2-ethylhexyl, methylamyl, 2-octanol, 2,6-dimethyl-4-heptanol, 2,6,8-triethyl-4-nonanol and mixtures thereof.

Unsaturated alcohols having the formula $$C_n-H_{2n-1}-OH$$

wherein n is 2 to 20, may also be employed. These include such alcohols as vinyl and allyl alcohol.

Other monofunctional active hydrogen compounds which may be employed are the alkylene oxide adducts of monofunctional active hydrogen compounds. These adducts may be homopolymers, block copolymers of 2 or more alkylene oxides or random copolymers of mixtures of alkylene oxides. The alkylene oxides may contain from 2 to 4 carbon atoms. The adducts have the following formula:

$$C_n-H_{2n+1}-O)(C_2H_4O)_x(C_3H_6O)_y(C_4H_8O)_zH$$

wherein n is 1 to 20, x is 0 to 10, y is 0 to 10, and z is 0 to 10 provided that if x and y are 0 then z must be at least 1, if x and z are 0 then y must be at least 1, and if y and z are 0 then x must be at least 1.

The amines which may be employed in the invention have the following formula:

wherein R and R" may be identical or different, R and $R^1$ may be H or alkyl radicals containing from 1 to 20 carbon atoms, phenyl or benzyl.

Those contemplated include ammonia, dimethylamine, methylethylamine, diethylamine, diisopropylamine, di-n-propylamine, diallylamine, diisobutylamine, di-n-butylamine, N-methylbenzylamine, phenylethylamine, N-ethylbenzylkamine, di-a-amylamine, dibenzylamine, and diphenylamine, n-octylamine, 2-ethylhexylamine, n-dodecylamine, tetradecylamine, cocoamine, n-hexydecylamine, n-octadecylamine, tallow amine, hydrogenated tallow amine, allylamine, soyamine, dihydrogenated tallow amine, dicocoamine and mixtures thereof. Also included are the secondary amines which have the above formula containing from 1 to 20 carbon atoms, which have been oxyethylated with from 1 to 10 moles of ethylene oxide per mole of secondary amine.

Still other monofunctional active hydrogen compounds are the monocarboxylic acids containing from 1 to 20 carbon atoms. Among these acids are formic, acetic, propionic, butanoic, pentanoic, hexanoic, caprylic, capric, lauric, myristic, coco, palmitic, stearic, oleic and mixtures thereof.

The monofunctional active hydrogen compounds are employed in such concentration that they will react with from 1 to 25 percent of the free NCO groups present.

The organic polyisocyanate employed in the instant invention corresponds to the formul $R'(NCO)z$ where R' is a polyvalent organic radical which is either aliphatic, arylalkyl, alkylaryl, aromatic or mixtures thereof and z is an integer which corresponds to the valence of R' and is at least 2. Representative of the types of organic polyisocyanates contemplated herein include, for example, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)-ether, bis(3-isocyanatopropyl)sulfide, 1,7-diisocyanatoheptane, 1,5-diisocyanato-2,2-dimethylpentane, 1,6-diisocyanate-3-methoxyhexane, 1,8-diisocyantooctane, 1,5-diisocyanoto-2,2,4-trimethylpentane, 1,9-diisocyanatononane, 1,10-diisocyanatopropyl ether of 1,4-butylene glycol, 1,11-diisocyanatoundecane, 1,12 diisocyanatododecane, bis(isocyanatohexyl) sulfide, 1,4-diisocyanatobenzene, 1,3-diisocyanato-o-xylene, 1,3-diisocyanato-p-xylen, 1,3-diisocyanate-m-xylene, 2,4-diisocyanato-1-chlorobenzene, 2,4-diisocyanato-1-nitrobenzene, 2,5-diisocyanato-1-nitrobenzene, m-phenylene diisocyanate, 2,4-toluene diisocyanate, 2,6-toluene diisocyanate, mixtures of 2,4- and 2,6-toluene diisocyanate, 1,6-hexamethylene diisocyanate, 1,4-tetramethylene diisocyanate, ,4-cyclohexane diisocyanate, hexahydrotoluene diisocyanate, 1,5-naphthylene diisocyanate, 1-methoxy-2,4-phenylene diisocyanate, 2,4'-diphenylmethane diisocyante, 4,4'-diphenylmethane diisocyanate, 4,4'-biphenylene diisocyanate, 3,3'-dimethoxy-4,4'-biphenyl diisocyanate, 3,3'-dimethyl-4,4'-diphenylmethane diisocyanate and 3,3'-dimethyldiphenylmethane-4,4'-diisocyanate; the triisocyanates such as 4,4',40"-triphenylmethane triisocyanate, polymethylene polyphenylene polyisocyanate and 2,4,6-toluene triisocyanate; and the tetraisocyanates such as 4,4'-dimethyl-2,2'-5,5'-diphenylmethane tetraisocyanate. Especially useful due to their availability and properties are toluene diisocyanate, 2,4'-diphenylmethane diisocyanate, 4,4'-diphenylmethane diisocyanate, polymethylene polyphenylene polyisocyanate and mixtures thereof.

The polyisocyanurate polymers of the instant invention may be prepared by employing well-known compounds as trimerization catalysts. Examples of these catalysts are (a) organic strong bases, (b) tertiary amine co-catalyst combinations, (c) Friedel Craft catalsysts, (d) basic salts of carboxylic acids, (e) alkali metal oxides, alkali metal alcoholates, alkali metal phenolates, alkali metal hydroxides and alkal metal carbonates, (f) onium compounds from nitrogen, phosphorus, arsenic, antimony, sulfur and selenium, and (g) mono-substituted monocarbamic esters. These include 1,3,5-tris(N,N-dialkylaminoalkyl)-s-hexahydrotriazines; the alkylene oxide and water additives of 1,3,5-tris (N,N-dialkylaminoalkyl)-s-hexahydrotriazines; 2,4,6-tris(dimethylaminomethyl)phenol; ortho, para- or a mixture of o- and p-dimethylaminomethyl phenol and triethylenediamine or the alkylene oxide and water adducts thereof, metal carboxylates such as lead octanoate, sodium and potassium salts of hydroxamic acid, and organic boron-containing compounds. Monofunctional alkanols containing from 1 to 24 carbon atoms, epoxides containing 2to 18 carbon atoms and alkyl carbonates may be used in conjunction with tertiary amine to accelerate the rate of the polymerization reaction. The concentration of trimerization catalysts that may be employed in the present invention is from 0.001 part to 20 arts of catalyst per 100 parts of organic polyisocyanate. The temperature ranges which may be employed for the polymerization reaction may range from 25° C. to 230° C., preferably from 25° C. to 120° C.

The trimerization catalysts may be deactivated employing an acid or an acid chloride. The acids such as hydrochloric acid, sulfuric acid, acetic acid, oxalic acid, phosphonic acid, methanesulfonic acid, trifluoromethanesulfonic acid, benzene-, toluene- or xylenesulfonic acids, and acid chlorides such as acetyl or benzoyl chloride, and sulfonyl chlorides such as benzene, toluene or xylene sulfonyl chloride may be employed. Another series of deactivators are alkylating agents such as dimethyl sulfate, o, or p-alkyl toluenesulfonates and methyl chloride which may also be employed.

The solvents which may be employed are those in which the organic polyisocyanates are soluble. These include, for example, acetone, acetonitrile, acetophenone, allyl acetate, benzyl Cellosolve, bromobenzene, o-bromostyrene, o-bromotoluene, p-bromotoluene, butyl acetate, 2-butyl acetate, butyl benzoate, butyl Cellosolve acetate, N-butylcyclohexane, carbon tetrachloride, Cellosolve acetate, 2-chloro-1,3-butadiene, chloroform, cyclohexane, cyclohexanone, dibutyl Cellosolve, dibutyl maleate, dibutyl phthalate, o-dichlorobenzene, m-dichlorobenzene, p-dichlorobenzene, 1,1-dichloroethane, dichloromethane, 1,1-diethoxybutane, 1,1-diethoxyethane, diethyl Cellosolve, diethyl maleate, diethyl phthalate, diethyl pimelate, diethyl succinate, diglycol diacetate, 1,3-dimethoxybutane, 1,1-dimethoxyethane, 3,3-dimethyl-2-butanone, 3,3-dimethylbutyl acetate, dimethyl Cellosolve, dimethyl phthalate, dimethylpimelate, 2,5-dimethyltetrahydrofuran, 1,4-dioxane, 1,3-dioxolane, diphenyl ether, ethyl acetate, ethyl acrylate, ethyl butyrate, diethyl ether, ethyl formate, 2-ethylhexyl acetate, ethyl propionate, m-ethyltoluene, o-ethyltoluene, p-ethyltoluene, glyceryl triacetate, glycol diacetate, glycol dipropionate, 2-heptanone, 3-heptanone, 4-heptanone, 3-hepten-2-one, 2-heptyl acetate, 3-heptyl acetate, hexyl acetate, hexyl acrylate, hexylene glycol diacetate, hexyl hexanoate, methyl cellosolve acetate, 5-methyl-2-hexanone, methyl propionate, 3-methylthiphene, 2-methylthiophene, 2-octanone, 3-pentanone, phenyl cellosolve acetate, propyl acetate, propylene dichloride, toluene, 1,1,2-trichloroethane, trichloroethylene, 1,2,3-trichloropropane, m-xylene, o-xylene, p-xylene, dimethyl formamide, dimethyl acetamide, dimethyl sulfoxide, N-methyl pyrrolidone, tetramethylene sulfone. Precipitating compounds which may be employed are: decane, 2,2-dimethylbutane, 2,3-dimethylbutane, 2,2-dimethylexane, 2,3-dimethylhexane, 3,3-dimethylhexane, 3,4-dimethylhexane, 2,5-dimethylhexane, 2,2-dimethylpentane, 2,3-dimethylpentane, 2,4-dimethylpentane, 3,3-dimethylpentane, 2,2-dimethylpropane, ethylcyclohexane, ethylcyclopentane, 3-ethylhexane, heptane, 1-heptene, 3-heptene-2-one, 1-hexene, 2-methylheptane, 3-methylheptane, 4-methylheptane, 2-methylhexane, 3-methylhexane, 2-methylpentane, 3-methylpentane, 4-methyl-2-pentene,cis, 4-methyl-2-pentene,trans, octane, 1-octene, 2-octene,cis, 2-octene,-trans, and pentane.

In accordance with the present invention, rigid, flexible, and microcellular foams may be prepared by the catalytic reaction of organic polyisocyanates with polyols containing therein the dispersed polyisocyanurate polymer in the presence of blowing agents, surfactants and other additives which may be deemed necessary. Non-cellular products may also be prepared in the absence of blowing agents.

Typical polyols which may be employed in the preparation of the foams of the instant invention include polyhydroxy-containing polyesters, polyoxyalkylene polyether polyols, polyhydroxy-terminated polyurethane polymers, polyhydroxy-containing phosphorus compounds, and alkylene oxide adducts of polyhydric sulfur-containing esters, polyacetals, aliphatic polyols or diols, ammonia, and amines including aromatic, aliphatic and heterocyclic amines as well as mixtures thereof. Alkylene oxide adducts of compounds which contain two or more different groups within the above-defined classes may also be used such as amino alcohols which contain an amino group and a hydroxyl group. Also, alkylene oxide adducts of compounds which contain one -SH group and one -OH group as well as those which contain an amino group and a -SH group may be used. Generally, the equivalent weight of the polyols will vary from 100 to 10,000, preferably from 1000 to 3000.

Any suitable hydroxy-terminated polyester may be used such as are obtained, for example, from the reaction of polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic aid, $\beta$-butyl-$\alpha$-ethyl-glutaric acid, $\alpha,\beta$-diethylsuccinic acid, isophthalic acid, terephthalic acid, hemimellitic acid, and 1,4-cyclohexanedicarboxylic acid. Any suitable polyhydric alcohol may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, $\alpha$-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

Any suitable polyoxyalkylene polyether polyol may be used such as the polymerization product of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-tetramethylene and polyoxyethylene glycols, and copolymer glycols prepared from blends as well as sequential addition of two or more alkylene oxides. The polyalkylene polyether polyols may be prepared by any known process such as, for example, the process disclosed by Wurtz in 1859 and Encyclopedia of Chemical Technology, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-bis(4-hydroxyphenyl)propane and blends thereof having equivalent weights of from 100 to 5000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing at least two -SH groups such as 1,2-ethanedithiol, 1,2-propanedithiol, 1,2-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and diaminotoluene; aliphatic amines such as methylamine, triisopropanolamine, ethylene diamine, 1,3-diaminopropane, 1,3-diaminobutane, and 1,4-diaminobutane.

The polyurethane foams of the present invention may also be prepared by the reaction of an organic polyisocyanate with a graft polymer polyol containing therein the dispersed polyisocyanurate polymer of the invention in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane plastics are disclosed in U.S. Pat. No. Re. 24,514 together with suitable machinery to be used in conjunction therewith. For the preparation of microcellular foams, blowing agents are generally not necessary. If desired for more expanded foams, they may be employed. When water is used, corresponding quantities of excess isocyanate to react with the water and produce carbon dioxide are necessary.

It is possible to proceed with the preparation of the polyurethane plastics by a prepolymer technique wherein an excess of organic polyisocyanate is reacted in a first step with the polyol containing the polyisocyanurate dispersion to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as flowing agents.

Chain-extending agents which may be employed in the preparation of the polyurethane foams include those compounds having at least two functional groups bearing active nitrogen atoms such as water, hydrazine, primary and secondary amines, amino alcohols, amino acids, hydroxy acids, glycols, or mixtures thereof. A preferred group of chain-extending agents includes water, ethylene glycol, 1,4-butanediol, and primary and secondary diamines which react more readily with the polyisocyanates than does water. These include phenylenediamine, ethylenediamine, diethylenetriamine, N-(2-hydroxypropyl)-ethylenediamine, N,N'-di(2-hydroxypropyl)ethylenediamine, piperazine, and 2-methylpiperazine.

Any suitable catalyst for the polyurethane formation may be used including tertiary amines such as, for example, triethylenediamine, N-methylmorpholine, N-ethylmorpholine, diethylaminoethanol, N-laurylmorpholine, 1-methyl-4(dimethylaminoethyl)piperazine, 3-methoxy-N,N'-dimethylpropylamine, N,N,N'-trimethylisopropylpropylenediamine, N,N,N',N'-tetraethylpropylenediamine, dimethylbenzylamine, and the like. Other suitable catalysts are, for example, tin compounds such as stannous chloride, tin salts of carboxylic acids, such as dibutyltin di-2-ethyl hexanoate and stannous octoate, as well as other organo metallic compounds such as are disclosed in U.S. Pat. No. 2,846,408.

If desired, a surface-active agent may be employed. Numerous surface-active agents have been found satisfactory. Nonionic surface-active agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkylsulfonic esters, and alkylarylsulfonic acids.

In the following examples, all parts are by weight unless otherwise designated and the following abbreviations are employed.

TDH—1,3,5-tris(N,N'-dimethylaminopropyl)-s-hexahydrotriazine;

Component A—a propylene oxide adduct of n-butanol sufficient to give a hydroxyl number of 52.6;

Component B—a 1:1 propylene oxide:ethylene oxide adduct of n-butanol sufficient to give a hydroxyl number of 31.9;

Component C—a 1:1 propylene oxide:ethylene oxide adduct of n-butanol sufficient to give a hydroxyl number of 76.8.

Component D—methanol;

Component E—n-butanol;

Component F—dibutylamine;

Component G—diethylamine;

Component H—a mixture of primary amines containing a mixture of $C_8$, $C_{10}$, $C_{12}$ and $C_{14}$ aliphatic amines having a molecular weight of 204;

Component I—a propylene oxide adduct of n-butanol having a molecular weight of about 1626;

Component J—a 1:1 propylene oxide:ethylene oxide adduct of n-butanol having a molecular weight of about 1927;

Component K—a 1:1 propylene oxide-ethylene oxide adduct of n-butanol having a molecular weight of about 4186;

Component L—an adduct of 1 equivalent of toluene diisocyanate with 1 equivalent of component C;

Component M—isopropanol;

Polyol A—a propylene oxide-ethylene oxide adduct of a mixture of propylene glycol and glycerol having a hydroxyl number of 33 and containing 15 percent ethylene oxide;

Polyol B—a propylene oxide adduct of glycerine having a hydroxyl number of about 57;

Polyol C—a propylene oxide-ethylene oxide adduct of a mixture of propylene glycol and glycerol having a hydroxyl number of 35 and containing 14 percent ethylene oxide;

Polyol D—a propylene oxide, ethylene oxide adduct of glycerol having a hydroxyl number of 35 and containing 16.5 percent ethylene oxide.

Polyol E—a propylene oxide, ethylene oxide adduct of trimethylolpropane having a hydroxyl number of 35 and containing 13 percent ethylene oxide.

L-5303—Silicone surfactant, Union Carbide;

DC-192—Silicone surfactant, Dow Corning;

T-12—Dibutyltin dilaurate, M and T;

DABCO WT—Amine catalyst, a product of Air Products Corporation;
TDI—(80/20) 2,4-', 2,6'-toluene diisocyanate;
MDI—diphenylmethane diisocyanate.

EXAMPLES 1-10

A reaction vessel equipped with a mechanical stirrer, thermometer, pressure equalized addition funnel, and a reflux condenser was purged with nitrogen and charged with 250 parts ethyl acetate and 87 parts of TDI. The isocyanate content of the solution at this stage was 12.5 percent by weight. The catalyst, TDH, in the amount of 0.4 part was added thereafter. An exotherm developed and reached about 40° C. The reaction mixture was then heated to 50° C. and maintained at that temperature for 3 hours. At this stage, the free isocyanate (NCO) content of the reaction mixture decreased to the value shown in Table I.

The polymerization was then stopped by the deactivation of the TDH catalyst by adding 0.4 parts of benzoyl chloride and stirring the reaction mixture for another 15 minutes at 50° C. Then, while still maintaining the reaction temperature at 50° C., components 1 and 2, as specified in Table I, were added dropwise over a period of 0.5 hour to 1 hour. The reaction was further continued for another 2 hours at which time all the free NCO groups were substantially reacted. The reaction contents were then transferred into the indicated polyol while the polyol was being rapidly mixed with a homogenizer. Thereafter, the solvent was removed under reduced pressure and the resultant polyisocyanurate polyol dispersion was homogenized to yield a fine particulate dispersion. The viscosity values of the dispersions prepared are shown in Table I. The percent solids in the polyol were 20 weight percent.

TABLE I

| Example | NCO % After Polymerization | Component 1 (g.) | Component 2 (g.) | Polyol | Viscosity cps./25° C. |
|---|---|---|---|---|---|
| 1 | 3.9 | D (10.1) | none | A | 2260 |
| 2 | 3.8 | D (29.3) | none | A | 2552 |
| 3 | 3.7 | E (22.1) | none | A | 4064 |
| 4 | 4.0 | E (71.5) | none | A | 4360 |
| 5 | 3.7 | E (22.1) | none | B | 1580 |
| 6 | 3.9 | E (20.4) | A (41.2) | A | 4200 |
| 7 | 4.2 | F (43.1) | none | A | 5320 |
| 8 | 3.6 | F (37.3) | none | A | 3760 |
| 9 | 3.5 | G (20.6) | none | A | 2400 |
| 10 | 3.6 | H (4.4) | F (35.1) | A | 3740 |

EXAMPLES 11-18

Into a reaction vessel as equipped in Examples 1-10, 87 grams of TDI and the indicated amount (Table II) of component 1 were placed and heated at 80° C. for one hour. The free isocyanate value of the product was determined to assure the completion of the reaction. Thereafter, 250 grams of ethyl acetate was added and the contents cooled to 25° C. TDH catalyst (0.4 gram) was then added. An exotherm developed to about 40° C. The reaction mixture was then heated to 50° C. and maintained at that temperature for 3 hours. At this stage, the free isocyanate content of the reaction mixture decreased to the value shown in Table II. The polymerization was then stopped by the deactivation of the TDH catalyst by adding 0.4 parts of benzoyl chloride and stirring the reaction mixture for another 15 minutes at 50° C. Then, while still maintaining the reaction temperature at 50° C., component 2, as specified in Table II, were added dropwise over a period of 0.5 hour to 1 hour. The reaction was further continued for another 2 hours at which time all the free NCO groups were substantially reacted. The reaction contents were then transferred into the indicated polyol while the polyol was being rapdily mixed with a homogenizer for another hour. Thereafter, the solvent was removed under reduced pressure and the resultant polyisocyanurate polyol dispersion was homogenized to yield a fine particulate dispersion. The viscosity values of the dispersions prepared are shown in Table II. The percent solids in the polyol were 20 weight percent.

TABLE II

| Example | Component 1 (g.) | % NCO After Reaction of Component 1 | % NCO Initial Solution | % NCO After Polymerization | Component 2 (g.) | Polyol | Viscosity cps./25° C. |
|---|---|---|---|---|---|---|---|
| 11 | E (17.4) | 39.0 | 9.6 | 3.8 | F (23.8) | A | 6000 |
| 12 | E (8.7) | 42.9 | 10.8 | 3.9 | F (22.9) | A | 3880 |
| 13 | B (4.4) | — | — | 3.8 | F (39.9) | A | 3920 |
| 14 | H (4.4) | 43.8 | 11.2 | 3.7 | F (38.9) | A | 3740 |
| 15 | B (4.4) | 44.5 | 11.4 | 3.7 | E (22.3) | A | — |
| 16 | C (4.4) | 44.8 | 11.4 | 3.5 | E (21.1) | A | 5280 |
| 17 | C (8.7) | 42.4 | 10.7 | 3.5 | E (20.5) | A | 5920 |
| 18 | C (17.4) | 38.2 | 9.4 | 3.6 | E (22.5) | A | 5280 |

EXAMPLES 19-22

Into the reaction vessel equipped as indicated in Examples 1-10, 87 grams of TDI and the indicated amount of component 1 were placed and heated at 150° C. for one hour. The isocyanate value of the product was determined to assure the completion of the reaction. Thereafter 250 parts of ethyl acetate and 87 parts of TDI. The isocyanate content of the solution at this stage is indicated in Table III. The catalyst, TDH, in the amount of 0.4 part was added thereafter. An exotherm developed and reached about 40° C. The reaction mixture was then heated to 50° C. and maintained at that temperature for 3 hours. At this stage, the isocyanate content of the reaction mixture decreased to the value shown in Table III, the polymerization was then stopped by the deactivation of the TDH catalyst by adding 0.4 parts of benzoyl chloride and stirring the reaction mixture for another 15 minutes at 50° C. Then, while still maintaining the reaction temperature at 50° C., component 2, as specified in Table III, was added dropwise over a period of 0.5 hour to 1 hour. The reaction was further continued for another 2 hours at which time all the free NCO groups were substantially reacted. The reaction contents were then transferred into the indicated polyol while the polyol was being rapidly mixed with a homogenizer. Thereafter, the solvent was removed under reduced pressure and the resultant polyisocyanurate polyol dispersion was homogenized to yield a fine particulate dispersion. The viscosity values of the dispersions prepared are shown in Table III. The percent solids in the polyol were 20 weight percent.

TABLE III

| Example | Component 1 (g.) | % NCO After Reaction of Component 1 | % NCO Initial Solution | % NCO After Polymerization | Component 2 (g.) | Polyol | Viscosity cps./25° C. |
|---|---|---|---|---|---|---|---|
| 19 | H (4.4) | 43.1 | 11.0 | 3.7 | F (38.9) | A | 3400 |
| 20 | H (4.4) | 43.1 | 11.0 | 3.4 | F (35.6) | A | 3460 |
| 21 | H (4.4) | 43.1 | 11.0 | 3.6 | F (37.9) | B | 1840 |
| 22 | H (8.7) | 39.3 | 9.9 | 3.5 | F (37.3) | A | 3500 |

EXAMPLES 23–28

A reaction vessel equipped as in Examples 1–10 was charged with 500 parts of ethyl acetate, and sufficient MDI to give a free isocyanate content of 6.72 percent. An amount of 0.68 part TDH catalyst was then added and the contents heated to 50° C. and maintained at that temperature for 5 hours. At this stage, the isocyanate content of the reacton mixture decreased to the value shown in Table IV. The polymerization was then stopped by the deactivation of the TDH catalyst by adding 0.4 parts of benzoyl chloride and stirring the reaction mixture for another 15 minutes at 50° C. Then, while still maintaining the reaction temperature at 50° C., components 1 and 2, as specified in Table IV, were added dropwise over a period of 0.5 hour to 1 hour. The reaction was further continued fo another 2 hours at which time all the free NCO groups were substantially reacted. The reaction contents were then transferred into the indicated polyol while the polyol was being rapidly mixed with a homogenizer. Thereafter, the solvent was removed under reduced pressure and the resultant polyisocyanurate polyol dispersion was homogenized to yield a fine particulate dispersion. The viscosity values of the dispersions prepared are shown in Table IV. The percent solids in the polyol were 20 weight percent.

TABLE IV

| Example | % NCO After Polymerization | Component 1 (g.) | Component 2 (g.) | Polyol | Viscosity cps./25° C. |
|---|---|---|---|---|---|
| 23 | 1.55 | none | E (21.5) | C | 4240 |
| 24 | 1.94 | C (10) | E (24.3) | C | 5480 |
| 25 | 2.24 | B (10) | E (24.1) | C | 3540 |
| 26 | 2.36 | K (10) | E (25.4) | C | 2900 |
| 27 | 2.09 | I (10) | E (22.5) | C | 3000 |
| 28 | 2.41 | C (10) | E (18.2) | C | 2900 |

EXAMPLES 29–56

A reaction vessel equipped as in Examples 1–10 was charged with 300 parts of ethyl acetate, 100 parts of toluene and 100 parts of TDI except no toluene was added in Examples 41–43. The free isocyanate content of the solution at this stage was 9.6 percent for all examples except 41–43 which had a free NCO content of 12.08. The catalyst TDH, in the amount of 0.6 parts, was then added. An exotherm developed and reached about 40° C. The reaction mixture was then heated to 50° C. and maintained at that temperature for 3 hours. At this stage, the isocyanate content of the reaction mixture decreased to the value shown in Table I, the polymerization was then stopped by the deactivation of the TDH catalyst by adding 0.4 parts of benzoyl chloride and stirring the reaction mixture for another 15 minutes at 50° C. Then while still maintaining the reaction temperature at 50° C., components 1 and 2, as specified in Table V, were added dropwise over a period of 0.5 hour to 1 hour. The reaction was further continued for another 2 hours at which time all the free NCO groups were substantially reacted. The reaction contents were then transferred into the indicated polyol while the polyol was being rapidly mixed with a homogenizer. Thereafter, the solvent was removed under reduced pressure and the resultant polyisocyanurate polyol dispersion was homogenized to yield a fine particulate dispersion. The viscosity values of the dispersions prepared are shown in Table V. The percent solids in the polyol were 20 weight percent except for Examples 55 and 56 which had a solids content of 30 weight percent.

TABLE V

| Example | % NCO After Polymerization | Component 1 (g.) | Component 2 (g.) | Polyol | Viscosity cps./25° C. |
|---|---|---|---|---|---|
| 29 | 3.13 | L (10) | E (36.5) | C | 3940 |
| 30 | 3.47 | C (10) | E (32.6) | C | 3640 |
| 31 | 3.28 | C (10) | E (27.9) | C | 5520 |
| 32 | 3.32 | C (10) | E (28.3) | C | 4080 |
| 33 | 3.22 | C (10) | E (30.1) | C | 4560 |
| 34 | 3.16 | C (10) | E (29.5) | C | 4000 |
| 35 | 3.11 | C (10) | E (29.0) | C | 4400 |
| 36 | 3.15 | C (10) | E (29.5) | C | 4480 |
| 37 | 3.33 | C (10) | E (31.1) | D | 5120 |
| 38 | 3.44 | C (10) | E (32.2) | D | 5840 |
| 39 | 2.93 | C (10) | E (27.3) | D | 5800 |
| 40 | 3.19 | C (10) | E (29.8) | E | 4280 |
| 41 | 3.37 | none | E (23.8) | C | 2760 |
| 42 | 3.65 | C (10) | 3 (26.1) | C | 3480 |
| 43 | 3.69 | C (5) | E (26.4) | C | 3800 |
| 44 | 3.17 | C (10) | E (26.9) | C | 6240 |
| 45 | 3.16 | C (10) | E (26.8) | C | 6720 |
| 46 | 3.10 | B (10) | B (26.9) | C | 7040 |
| 47 | 3.36 | L (10) | E (29.6) | C | 4560 |
| 48 | 3.17 | L (10) | E (28.0) | C | 5280 |
| 49 | 3.24 | C (10) | D (13.1) | D | 2480 |
| 50 | 3.28 | B (10) | D (13.3) | D | 2520 |
| 51 | 3.23 | C (10) | D (13.1) | D | 2760 |
| 52 | 3.00 | C (10) | D (12.1) | D | 4400 |
| 53 | 3.23 | C (10) | M (24.5) | C | 9400 |
| 54 | 3.21 | None | M (25.3) | C | 7320 |
| 55 | 3.42 | C (10) | E (25.4) | D | 10,000 |
| 56 | 3.21 | C (10) | E (30.0) | E | 11,500 |

EXAMPLES 57–66

The designated polyisocyanurate dispersion (300 grams), 9.0 grams of water, 4.0 grams of L-5303, 2.1 grams of Dabco WT were mixed for 30 seconds using a Lightnin Model V-7 stirrer equipped with a 1.5 inch shrouded mixing blade. Whereupon 0.1 gram of T-12 was added and the mixture was mixed for another 15 seconds. A TDI/crude MDI (80/20) mixture was added, mixed for 5 seconds, poured into a one-gallone container and the form was allowed to rise. The resulting foam was cured at 110° C. for 8 minutes. The polyisocyanurate dispersions employed and the physical properties of the foams are shown in Table VI below.

TABLE VI

| | \multicolumn{10}{c}{Example} |
|---|---|---|---|---|---|---|---|---|---|
| | 57 | 58 | 59 | 60 | 61 | 62 | 63 | 64 | 65 | 66 |
| Dispersion of Example 1 | none | 20 | 21 | 22 | 17 | 12 | 11 | 2 | 4 | 3 |
| Physical Properties | | | | | | | | | | |
| Density pcf. | 1.83 | 1.73 | 1.70 | 1.69 | 1.71 | 1.67 | 1.83 | 1.67 | 1.70 | 1.81 |
| Tensile str., psi. | 10.4 | 16.4 | 15.1 | 14.8 | 16.2 | 13.7 | 16.7 | 11.8 | 14.2 | 11.4 |
| Elongation, % | 153 | 180 | 150 | 157 | 170 | 160 | 173 | 113 | 127 | 107 |
| Tear strength, pi. | 1.0 | 1.9 | 1.8 | 1.5 | 1.9 | 1.8 | 1.7 | 1.2 | 1.6 | 1.4 |
| ILD, lb./sq.in. (1" thick) load at | | | | | | | | | | |
| 25% defl. | 0.5 | 0.8 | 0.6 | 0.5 | 0.6 | 0.7 | 0.5 | 0.6 | 0.6 | 0.6 |
| 50% | 0.9 | 1.3 | 1.0 | 0.9 | 1.1 | 1.2 | 1.0 | 1.0 | 1.0 | 1.1 |
| 65% | 1.2 | 1.8 | 1.4 | 1.3 | 1.5 | 1.6 | 1.4 | 1.4 | 1.4 | 1.5 |
| 25% return | 0.4 | 0.5 | 0.4 | 0.4 | 0.4 | 0.5 | 0.4 | 0.3 | 0.3 | 0.4 |
| Sag factor | 2.37 | 2.43 | 2.41 | 2.60 | 2.40 | 2.19 | 2.72 | 2.50 | — | 2.50 |
| Guide factor | 0.3 | 0.4 | 0.3 | 0.3 | 0.4 | 0.4 | 0.3 | 0.3 | 0.3 | 0.3 |
| Recovery, % | 81.6 | 69.3 | 71.2 | 72.9 | 69.8 | 71.2 | 67.9 | 60.5 | 76.3 | 66.7 |
| CLD, psi. load at 50% defl. | 0.21 | 0.37— | 0.34 | 0.30— | 0.36 | 0.35 | 0.36 | 0.28 | 0.29 | 0.41 |
| Compression set, % 50% | 15.3 | 20.3 | 14.6 | 17.6 | 15.6 | 14.2 | 22.0 | 17.7 | 16.0 | 13.7 |
| Air flow, CFM. at 0.5" Water | 1.24 | 2.06 | 1.94 | 1.86 | 1.75 | 1.08 | 1.57 | 0.60 | 0.70 | 0.65 |

The embodiments of the invention in which an exclusive privilege or property is claimed are defined as follows:

1. A dispersible polisocyanurate polymer prepared by (a) partially reacting an organic polyisocyanate with a monofunctional active hydrogen compound, (b) polymerizing the product of (a) in an organic solvent in the presence of an effective amount of a trimerization catalyst, (c) deactivating said catalyst, and (d) reacting the residual free isocyanate with a monofunctional active hydrogen compound or mixtures thereof.

2. The dispersible polyisocyanate polymer of claim 1 prepared in the presence of an adduct of equivalent quantities of an organic polyisocyanate, and a monofunctional active hydrogen compound.

3. A dispersible polyisocyanurate polymer prepared by (a) partially reacting an organic polyisocyanate with an amine to form a biuret, (b) polymerizing the product of (a) in an organic solvent in the presence of an effective amount of a trimerization catalyst, (c) deactivating said catalyst, and (d) reacting the residual free isocyanate with a monofunctional active hydrogen compound or mixtures thereof.

4. The dispersible polyisocyanate polymer of claim 3 prepared in the presence of an adduct of equivalent quantities of an organic polyisocyanate and a monofunctional active hydrogen compound.

5. A dispersible polyisocyanurate polymer prepared in the presence of an adduct of equivalent quantities of an organic polyisocyanate, and a monofunctional active hydrogen compound, said polymer prepared by (a) polymerizing an organic polyisocyanate in an organic solvent in the presence of an effective amount of a trimerization catalyst, (b) deactivating said catalyst, and (c) reacting the residual free isocyanate with a monofunctional active hydrogen compound or mixtures thereof.

6. A 1 to 80 percent by weight dispersion of polyisocyanurate polymer in a polyol prepared by (a) polymerizing an organic polyisocyanate in an organic solvent in the presence of an effective amount of a trimerization catalyst, (c) deactivating said catalyst, (c) reacting the residual free isocyanate with a monofunctional active hydrogen compound or mixtures thereof, (d) mixing the solution with a polyol, and (e) removing the organic solvent.

7. The polymer of claim 6 prepared in the presence of an adduct of equivalent quantities of an organic polyisocyanate, and a monofunctional active hydrogen compound.

8. A process for preparing a dispersible polisocyanurate polymer by (a) partially reacting an organic polyisocyanate with a monofunctional active hydrogen compound, (b) polymerizing the product of (a) in an organic solvent in the presence of an effective amount of a trimerization catalyst, (c) deactivating said catalyst, and (d) reacting the residual free isocyanate with a monofunctional active hydrogen compound or mixtures thereof.

9. The process of claim 8 wherein said polymerization is conducted in the presence of an adduct of equivalent quantities of an organic polyisocyanate, and a monofunctional active hydrogen compound.

10. In a polyurethane foam prepared by the reaction of a polyol, an organic polyisocyanate, catalyst, blowing agent and optionally other additives, the improvement comprising employing the dispersion of the process of claim 9 in said polyol.

11. In a polyurethane foam prepared by the reaction of a polyol, an organic polyisocyanate, catalyst, blowing agent and optionally other additives, the improvement comprising employing the dispersion of the process of claim 9 in said polyol.

12. In a non-cellular polyurethane product prepared by the reaction of a polyol, an organic polyisocyanate, catalyst, and optionally other additives, the improvement comprising employing the dispersion of the process of claim 9 in said polyol.

13. In a non-cellular polyurethane product prepared by the reaction of a polyol, an organic polyisocyanate, catalyst, and optionally other additives, the improvement comprising employing the dispersion of the process of claim 8 in said polyol.

14. A process for preparing a dispersible polyisocyanurate polymer by (a) partially reacting an organic polyisocyanate with an amine to form a biuret, (b) polymerizing the product of (a) in an organic solvent in the presence of an effective amount of a trimerization catalyst, (c) deactivating said catalyst, and (d) reacting the residual free isocyanate with a monofunctional active hydrogen compound or mixtures thereof.

15. The process of claim 14 wherein said polymerization is conducted in the presence of an adduct of equivalent quantities of an organic polyisocyanate and a monofunctional active hydrogen compound.

16. In a polyurethane foam prepared by the reaction of a polyol, an organic polyisocyanate, catalyst, blowing agent and optionally other additives, the improvement comprising employing the dispersion of the process of claim 14 in said polyol.

17. In a polyurethane foam prepared by the reaction of a polyol, an organic polyisocyanate, catalyst, blowing agent and optionally other additives, the improvement comprising employing the dispersion of the process of claim 15 in said polyol.

18. In a non-cellular polyurethane product prepared by the reaction of a polyol, an organic polyisocyanate, catalyst, and optionally other additives, the improvement comprising employing the dispersion of the process of claim 15 in said polyol.

19. In a non-cellular polyurethane product prepared by the reaction of a polyol, an organic polyisocyanate, catalyst, and optionally other additives, the improvement comprising employing the dispersion of the process of claim 14 in said polyol.

20. A process for preparing a dispersible polyisocyanurate polymer by (a) polymerizing an organic polyisocyanate in an organic solvent in the presence of an effective amount of a trimerization catalyst, (b) deactivating said catalyst, and (c) reacting the residual free isocyanate with a monofunctional active hydrogen compound or mixtures thereof, wherein said polymerization is conducted in the presence of an adduct of equivalent quantities of an organic polyisocyanate, and a monofunctional active hydrogen compound.

21. In a polyurethane foam prepared by the reaction of a polyol, an organic polyisocyanate, catalyst, blowing agent and optionally other additives, the improvement comprising employing the dispersion of the process of claim 20 in said polyol.

22. In a non-cellular polyurethane product prepared by the reaction of a polyol, an organic polyisocyanate, catalyst, and optionally other additives, the improvement comprising employing the dispersion of the process of claim 20 in said polyol.

23. A process for preparing a dispersion of polyisocyanurate polymer in a polyol by (a) polymerizing an organic polyisocyanate in an organic solvent in the presence of an effective amount of a trimerization catalyst, (b) deactivating said polymerization catalyst, (c) reacting the residual free isocyanate with a monofunctional active hydrogen compound or mixtures thereof, (d) mixing the solution with a polyol, and (e) removing the organic solvent.

24. The process of claim 23 wherein said polymerization is conducted in the presence of an adduct of equivalent quantities of an organic polyisocyanate and a monofunctional active hydrogen compound.

25. In a polyurethane foam prepared by the reaction of a polyol, an organic polyisocyanate, catalyst, blowing agent and optionally other additives, the improvement comprising employing the dispersion of the process of claim 23 in said polyol.

26. In a polyurethane foam prepared by the reaction of a polyol, an organic polyisocyanate, catalyst, blowing agent and optionally other additives, the improvement comprising employing the dispersion of the process of claim 24 in said polyol.

27. In a non-cellular polyurethane product prepared by the reaction of a polyol, an organic polyisocyanate, catalyst, and optionally other additives, the improvement comprising employing the dispersion of the process of claim 24 in said polyol.

28. In a non-cellular polyurethane product prepared by the reaction of a polyol, an organic polyisocyanate, catalyst, and optionally other additives, the improvement comprising employing the dispersion of the process of claim 23 in said polyol.

29. A 1 to 80 percent by weight dispersion of polyisocyanurate polymer in a polyol prepared by (a) partially reacting an organic polyisocyanate with a monofunctional active hydrogen compound, (b) polymerizing the product of (a) in an organic solvent in the presence of an effective amount of a trimerization catalyst, (c) deactivating said catalyst, (d) reacting the residual free isocyanate with a monofunctional active hydrogen compound or mixtures thereof, (e) mixing the solution with a polyol, and (f) removing the organic solvent.

30. The polymer of claim 29 prepared in the presence of an adduct of equivalent quantities of an organic polyisocyanate, and a monofunctional active hydrogen compound.

31. A 1 to 80 percent by weight dispersion of polyisocyanurate polymer in a polyol prepared by (a) partially reacting an organic polyisocyanate with an amine to form a biuret, (b) polymerizing the product of (a) in an organic solvent in the presence of an effective amount of a trimerization catalyst, (c) deactivating said catalyst, (d) reacting the residual free isocyanate with a monofunctional active hydrogen compound or mixtures thereof, (e) mixing the solution with a polyol, and (f) removing the organic solvent.

32. The polymer of claim 31 prepared in the presence of an adduct of equivalent quantities of an organic polyisocyanate, and a monofunctional active hydrogen compound.

* * * * *